United States Patent [19]
Lipp et al.

[11] Patent Number: 5,546,077
[45] Date of Patent: Aug. 13, 1996

[54] REMOTELY PROGRAMMABLE PAGER

[75] Inventors: Ronald L. Lipp, Snellville, Ga.; David Rodriguez, Arlington, Tex.; Michio Toriya, Ichikawa, Japan; Junji Kanjo, San Diego, Calif.; Shizuo Otsuka, Tokyo, Japan

[73] Assignee: Uniden America Corporation, Fort Worth, Tex.

[21] Appl. No.: 287,765

[22] Filed: Aug. 9, 1994

Related U.S. Application Data

[63] Continuation of Ser. No. 830,380, Jan. 31, 1992, abandoned.

[51] Int. Cl.⁶ .................................................. H04Q 7/14
[52] U.S. Cl. ........................... 340/825.440; 340/825.270
[58] Field of Search ...................... 340/825.44, 825.48, 340/825.15, 825.26, 825.27, 311.1; 455/38.2, 38.4

[56] References Cited

U.S. PATENT DOCUMENTS

| | | | |
|---|---|---|---|
| 4,383,257 | 5/1983 | Giallanza et al. | 340/825.44 |
| 4,422,071 | 12/1983 | De Graaf | 340/825.44 |
| 4,839,628 | 6/1989 | Davis et al. | 340/311.1 |
| 4,845,491 | 7/1989 | Fascenda et al. | 340/825.44 |
| 4,868,561 | 9/1989 | Davis | 340/825.44 |
| 4,910,510 | 3/1990 | Davis et al. | 340/825.44 |
| 4,959,644 | 9/1990 | Sato | 340/825.44 |
| 5,005,013 | 4/1991 | Tsukamoto et al. | 340/825.44 |
| 5,010,330 | 4/1991 | Snowden et al. | 340/825.44 |
| 5,012,234 | 4/1991 | Dulaney | 340/825.44 |
| 5,025,252 | 6/1991 | DeLuca et al. | 340/825.44 |

FOREIGN PATENT DOCUMENTS

| | | |
|---|---|---|
| 360216 | 3/1990 | European Pat. Off. . |
| 404007 | 12/1990 | European Pat. Off. . |
| 2219423 | 6/1989 | United Kingdom . |
| WO8809104 | 11/1988 | WIPO . |
| WO9015511 | 12/1990 | WIPO . |

OTHER PUBLICATIONS

PMR 2000, Personal Message Receiver, POCSAG (CCIR Radio Paging Code #1), Motorola 1986.

*Primary Examiner*—Donald J. Yusko
*Assistant Examiner*—Edwin C. Holloway, III
*Attorney, Agent, or Firm*—Richards, Medlock & Andrews

[57] ABSTRACT

A method and apparatus for secure, remote programming of a receiving device by instructions transmitted in data format, whereby previously stored messages may be selectively updated, capcodes may be reprogrammed, and the pager display may be activated or deactivated.

6 Claims, 7 Drawing Sheets

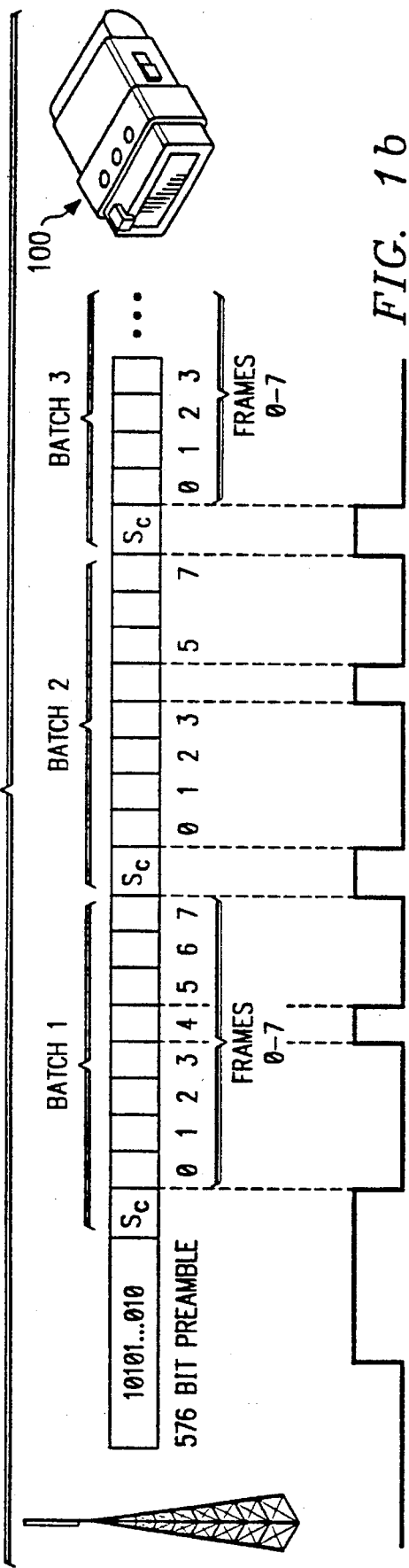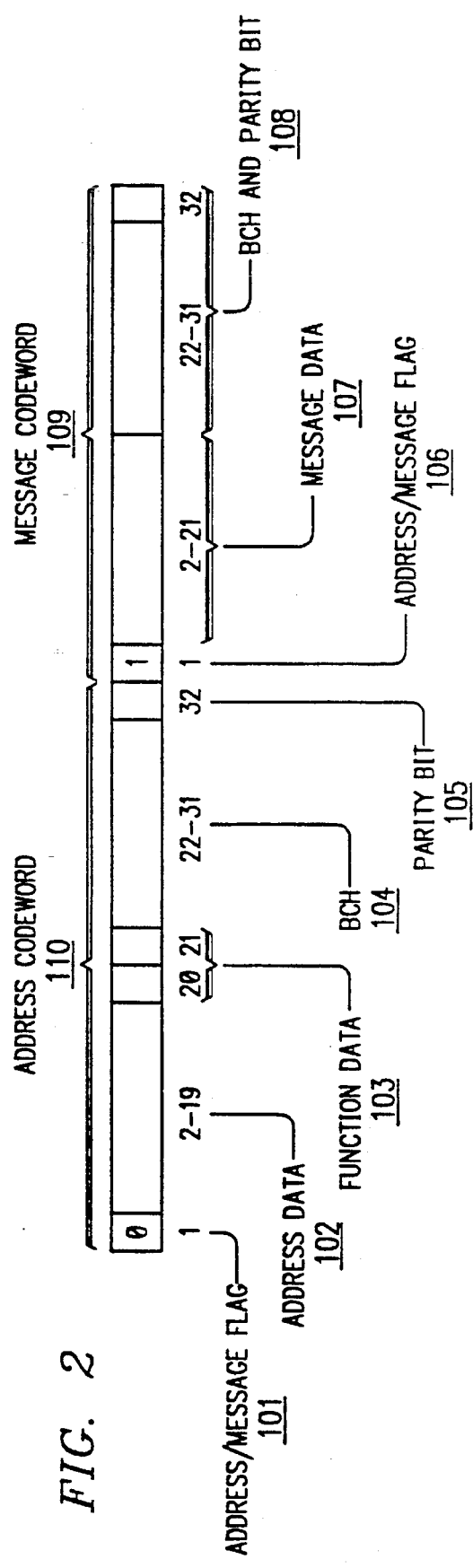

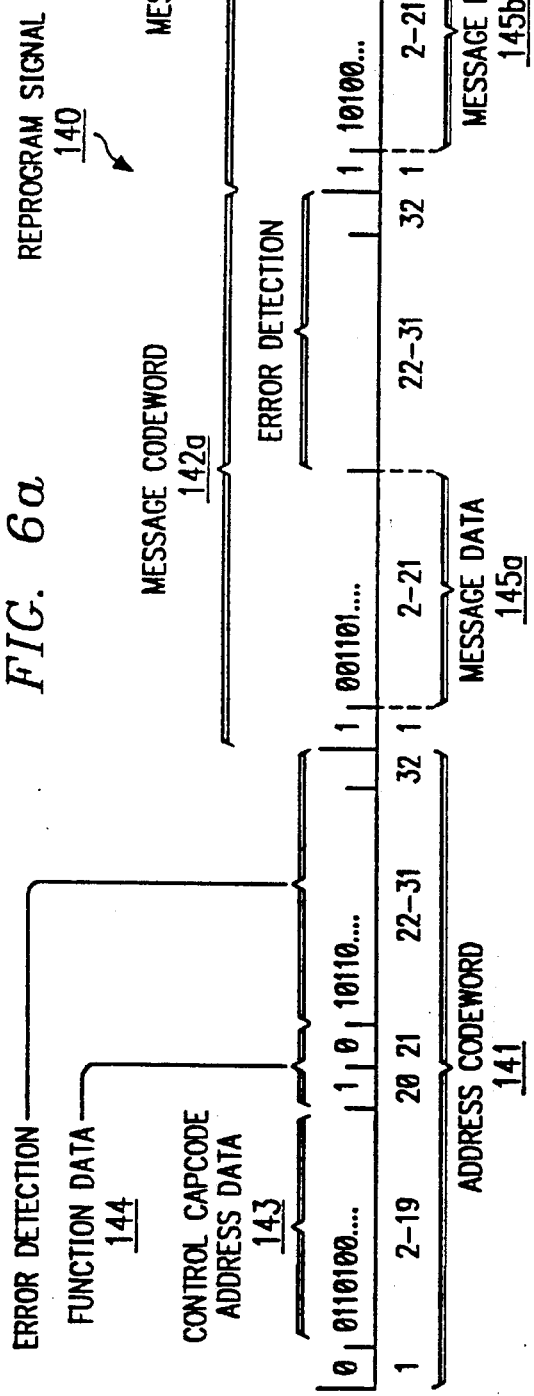
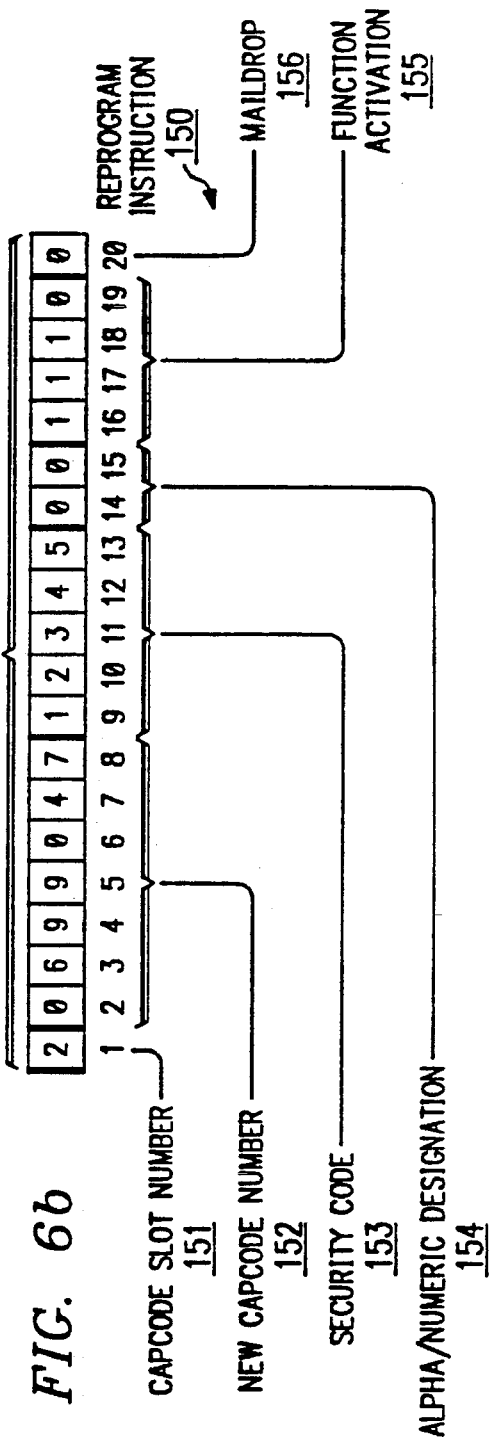
FIG. 6a
FIG. 6b

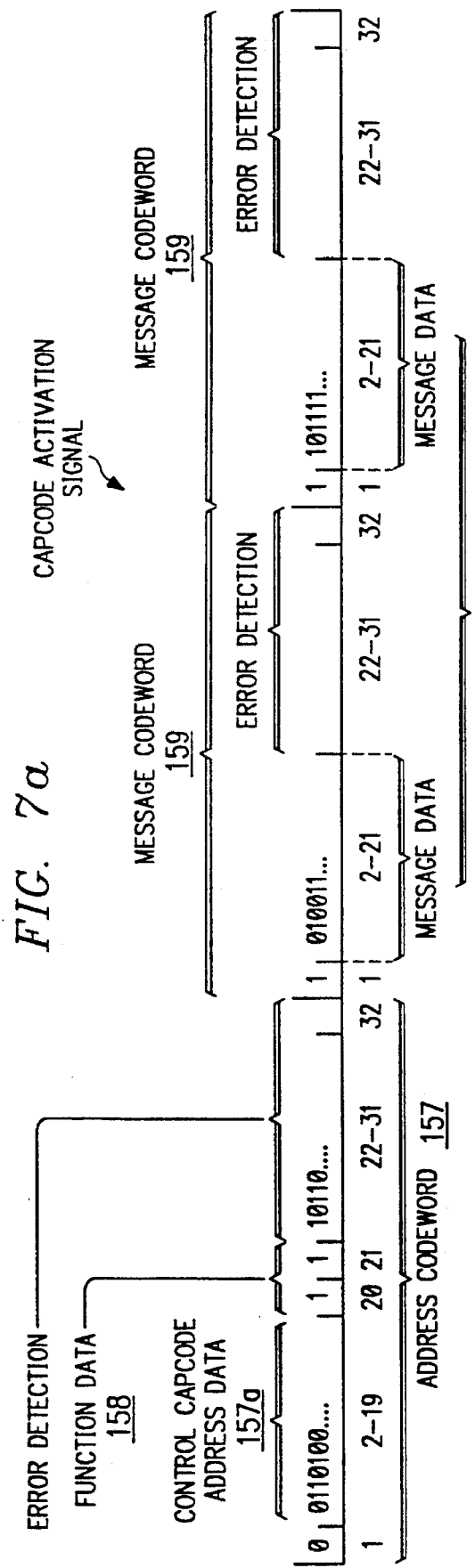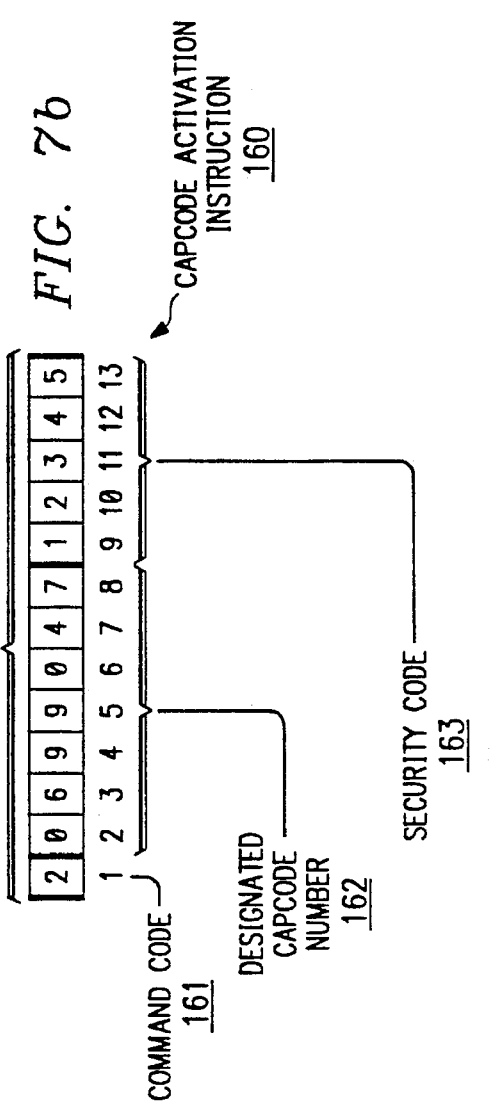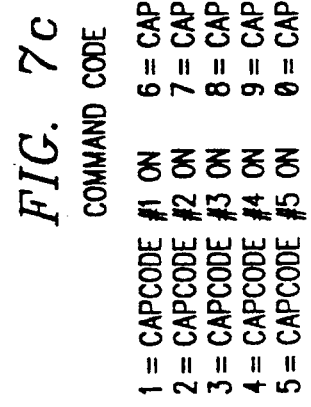
FIG. 7a
FIG. 7b
FIG. 7c

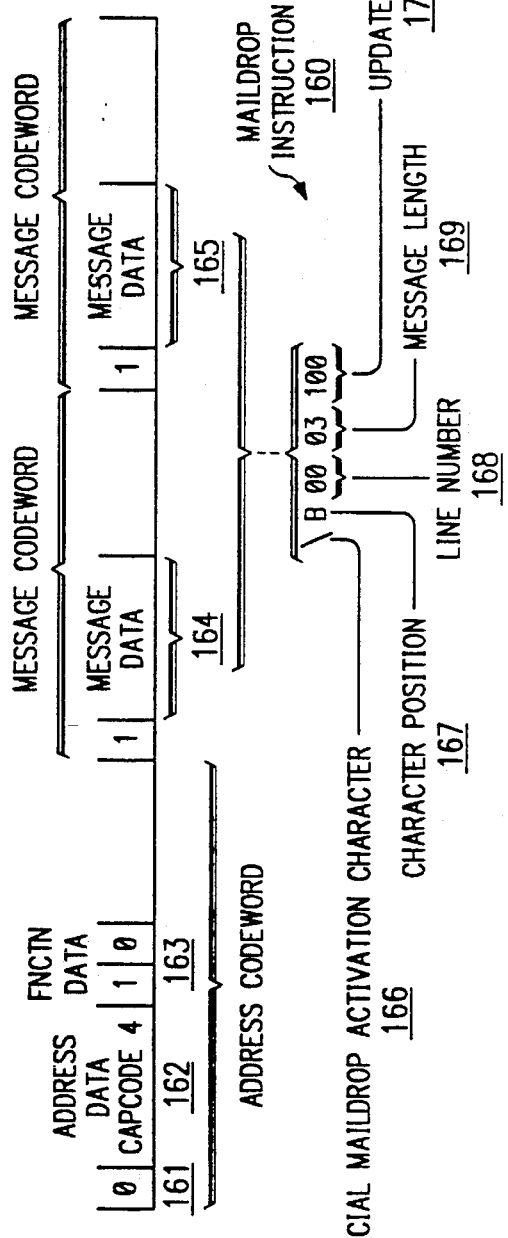

REMOTELY PROGRAMMABLE PAGER

This application is a continuation of application Ser. No. 07/830,380, filed on Jan. 31, 1992, now abandoned.

TECHNICAL FIELD OF THE INVENTION

The present invention pertains in general to a remotely programmable communication receiver which can be selectively activated or programmed over the air through radio signals to update message information or otherwise alter receiver operation.

BACKGROUND OF THE INVENTION

The present invention relates generally to communication receiver systems, and in one embodiment, relates to paging systems which provide a plurality of information services to subscribing pager receivers. In such pager receivers, a particular information service is assigned to a particular capcode having a specified function state.

One widely used system for transmitting pager information is the POCSAG coding protocol for transmission of data which is illustrated in FIG. 1a. Data transmitted according to the POCSAG scheme consists of a preamble data stream followed by a plurality of data batches. The preamble data stream may be at least a 576 bit sequence of reversal bits, 010101 . . . 10, which is used to signal the pager to turn "on" and synchronize with the succeeding data batches. Each batch commences with a predetermined synchronization code $S_c$ followed by a plurality of data frames. Under the standard POCSAG scheme, there are eight frames per batch, and each pager receiver is assigned to a particular frame of each transmission batch. Each frame may be comprised of two codewords with each codeword having 32 bits of data.

The allocation of the bits under the POCSAG format is shown in FIG. 2. Under the POCSAG scheme, the first bit of the codeword is the Address/Message Flag 101 which identifies whether the codeword is an address codeword or a message codeword. If the Address/Message Flag is "0," the codeword is an address codeword, but when the flag is "1," the codeword is a message codeword. In an address codeword, the Address/Message Flag 101 is followed by address data 102 (bits 2–19), function data 103 (bits 20, 21), Bose, Chaudhuri and Hocquenghen (BCH) data 104 (bits 22–31), and an even parity bit 105 (bit 32). In a message codeword, the Address/Message Flag 106 is followed by message data 107 (bits 2–21), and error correction bits 108 (bits 22–32).

The two function bits 103 represent four function states with the combinations "00," "01," "10" and "11." The BCH bits 104 serve to correct errors that arise during the transmission of the address data. For instance, incomplete demodulation may result in an error. Thereafter, the even parity bit 105 further serves as an error check by representing whether the total number of "1"s from the start bit to the end bit correspond to an odd or even number.

In pager receivers using the POCSAG transmission format, each pager has at least one capcode or self call number which is an identification number assigned to the pager. Capcodes are stored in capcode slots in the pager's capcode memory (i.e., a first capcode is stored in capcode slot number 1, a second in slot number 2, etc.). The capcode number determines which frame of a batch will be read by the pager, and if there are multiple capcodes for a given pager, all capcodes must use the same frame.

Upon detection of the preamble and synchronization codeword, the pager turns "on" at its designated frame and demodulates the incoming radio signal into a data stream (see FIG. 1b). When, as shown in FIG. 2, the first codeword of the data stream is an address codeword 110 (because the Address/Message Flag 101 is set to "0"), the capcode or capcodes are retrieved from the pager memory for comparison to the address data 102 (i.e., bits 2–19). If none of the stored capcodes match or coincide with the address data 102, the pager 100 turns "off" for a predetermined amount of time and no further data is read. However, if one of the stored capcodes matches with the received address data 102, the pager 100 recognizes that it has been designated to receive additional information, and the pager 100 remains "on" to receive additional data. It will be understood that "matching" as used herein refers not only to strict one-to-one identity, but also to broader types of correspondence, including look-up tables, and other comparison means.

According to the POCSAG format, the next data to be received by the pager is the function data 103 (bits 20, 21) which represent four different function states (i.e., Functions A, B, C and D) associated with a particular capcode. The function bits 103 can be used to indicate a display mode or an alert mode.

Pagers in normal operation will turn "on" at the designated frame to receive address data 102 and, upon detection of coincidence between the address data 102 and one of the storage capcodes, will receive and process message data 107 contained in succeeding message codewords 109 (i.e., codewords having an Address/Message Flag 106 set to "1"). Thus, if numeric message data 107 is to be transmitted to a particular pager 100, an address codeword 110 is transmitted with address data 102 corresponding to the pager's capcode and with function data 103 indicating, for example, the type of alert. Thereafter, a message codeword 109 or sequence of message codewords is transmitted with numeric message data 107 contained in bits 2–21. This message data 107 is processed by the pager 100 and stored in a message memory for possible display to the subscriber. The subscriber would be notified of the presence of new information in the pager memory by an alert or other means as set by the function data in the address codeword. Upon completion of the transmission of message data, the pager turns off, but is periodically turned on to detect preamble data.

One of the advantages of the POCSAG protocol is reduced power consumption and extended battery life resulting from the pager power supply being kept on only when necessary. As seen in FIG. 1b, after turning "on" in response to the preamble data stream, the pager turns "on" only to read the synchronization codeword $S_c$ and one of the eight frames in each batch, but is otherwise turned "off." The designated frame for a pager is determined by the capcode number or numbers stored in the pager. After synchronization, the pager turns "on" at its designated frame to determine whether any detected address data matches with or is identical to the pager's stored capcode. If not, the pager turns off the power supply for a predetermined amount of time and no further data is processed.

A common feature on many pagers is the standard maildrop feature whereby message data is sent to a particular pager under address data which matches with the pager's maildrop capcode. Any message sent to a maildrop capcode is stored in a maildrop memory area, and any subsequent messages sent to that same maildrop capcode will completely overwrite and replace any previously-stored maildrop messages. Thus, if any messages containing only slight modifications (such as updated stock quotations) are to be sent, they must be retransmitted in their entirety so that any previous maildrop message can be completely replaced.

While the use of the POCSAG transmission scheme in pager systems is well known in the art, any changes in or additions to the pager services for a particular pager receiver require that the subscriber bring the pager unit "in shop" for reprogramming. This results in inconvenience not only to the subscriber who must bring the pager unit in for servicing, but also to the provider of paging service information who cannot add services or terminate services which have not been paid for until the pager unit is brought "in shop."

In addition, a certain amount of inefficiency is associated with conventional pager systems in that lengthy message texts with only minor alterations must be retransmitted in their entirety to each frame of the POCSAG signalling system, thereby consuming valuable air time for the transmission of "old" information.

The present invention sets forth a system for remote programming of a communication receiver which enables the provider of pager information services to program the pager unit over the air, and further enables the efficient transmission of message text information.

SUMMARY OF THE INVENTION

A receiving device, such as a pager, is disclosed which has a selectively activated receiver for receiving a radio signal and demodulating the radio signal into a data stream comprised of address data, function data, and message data. The receiver is connected to and activated by a controller, such as a central processing unit (CPU), decoder, or other controlling device, which compares received address data to capcode data which is internally stored in a capcode memory to determine whether the received address data and capcode data correspond or otherwise match. If there is a match, instructions contained in the function data or message data are executed by the controller in accordance with the particular capcode received.

If a control capcode is received, the pager display will be disabled upon further reception of function data having a first state, or the display will be reactivated upon further reception of function data having a second state. Where the control capcode is received along with function data having a third state, the controller may reprogram one of the stored capcodes in accordance with further instructions contained in the message data. Alternatively, reception of the control capcode data along with function data in a fourth state will cause the controller to activate or deactivate selected capcodes in accordance with the instructions contained in succeeding message codewords. The pager further includes a message memory for storing message data which may be selectively updated upon reception of address data which matches with a special maildrop capcode, and upon further reception of instructions in succeeding message codewords which designate the location and content of an update message.

Also disclosed is a remotely programmable display pager system for selective reception of radio communications transmitted in accordance with the POCSAG format in which the pager is programmed to receive and store message data in a message memory when received address data matches with one of a plurality of storage capcodes stored in the pager's capcode memory, and the pager is further programmed to execute pager programming instructions contained in the function data or message data which follows address data that matches with the pager's control capcode. The pager is further programmed to selectively update a previously stored message upon reception of address data which corresponds to or matches with a special maildrop capcode whereby new message data is stored in memory positions specifically designated by information contained in the message data that follows the matching address data so that only portions of a message stored in memory are updated.

A method for over-the-air programming of a pager which operates under the POCSAG format is also disclosed, including, but not limited to receiving a radio signal; demodulating the radio signal into address data, function data or message data; comparing the address data to storage capcodes, control capcodes and special maildrop capcodes for identity; processing for possible storage and display any message data following address data that coincides with a storage capcode, and executing any pager programming instructions contained in the function and/or message data following address data that corresponds with the control capcode or special maildrop capcode. Execution of the pager programming instruction may cause the pager display to be disabled from displaying any message data, or may reactivate a previously deactivated pager display. Execution of pager programming instructions may also be used to selectively activate or deactivate storage capcodes or to reprogram a storage capcode or its associated specifications, such as the capcode slot number, the capcode number itself, the alphanumeric designation for a particular capcode, the function activation commands for a particular capcode, or the maildrop instruction for that capcode.

The invention further relates to a special maildrop method and apparatus whereby a receiver selectively receives radio communications and demodulates the radio communications into a data stream comprised of address data, function data, and message data. The receiver includes a memory storage area for storing transmitted message data and includes a CPU or other controller which is responsive to pager programming instructions contained in the address data, function data and message data for programmably changing only specifically designated data in the message memory.

BRIEF DESCRIPTION OF THE DRAWINGS

For a more complete understanding of the present invention and the advantages thereof, references is now made to the following Detailed Description taken in conjunction with the accompanying drawings, in which:

FIG. 1a illustrates a time-based digital representation of a radio signal transmission in accordance with the POCSAG coding protocol;

FIG. 1b is a waveform illustrating how the pager receiver turns "on" and "off" in response to synchronization codewords and its assigned frame (in this case, frame 4) contained in the radio signal shown in FIG. 1a;

FIG. 2 is a representation of the data stream in a particular frame which includes an address codeword and a message codeword;

FIG. 6a is a digital representation of a pager programming instruction for reprogramming a storage capcode and/or its associated specifications;

FIG. 6b is a character representation of an instruction character sequence contained in the message codewords shown in FIG. 6a in accordance with One embodiment of the invention;

FIG. 7a is a digital representation of a pager programming instruction for activating or deactivating a stored capcode;

FIG. 7b is a character representation of an instruction character sequence contained in the message codeword(s) of the pager programming instruction shown in FIG. 7a in accordance with another embodiment of the present invention for activating or deactivating selected capcodes;

FIG. 7c is a table depicting command codes and corresponding instructions to turn "on" or "off" selected capcodes in a pager;

FIG. 10 is a table depicting the storage capcodes, special maildrop capcodes and control capcode along with the respective function states (Functions A, B, C and D);

FIG. 11a illustrates the special mail drop memory bank for the pager which contains a message to be shown on the pager display;

FIG. 11b is a digital representation of a pager programming instruction for selective placement of update information in a memory bank in accordance with a still further embodiment of the present invention; and FIG. 11c is a character representation of the instruction character sequence contained in the message codeword(s) of the pager programming instruction illustrated in FIG. 11b.

DETAILED DESCRIPTION

In order to best illustrate the utility of the present invention, it is described in conjunction with a communication receiver such as a paging receiver capable of receiving and decoding transmitted signals. While the present invention is described hereinafter with particular reference to a paging receiver, it is to be understood at the outset that the apparatus and methods of the present invention may be used with numerous other communication receivers.

In order to add new information services or deactivate an old service or otherwise reprogram certain prior art pagers, it has been necessary for the prior art pager unit to be brought "in shop" for reprogramming. To avoid the delay, inconvenience and expense involved with bringing a pager unit "in shop" for any reprogramming of the capcode or other pager performance specifications, the present invention provides for remote programming of the pager's capcodes by means of a special capcode, called a control capcode. A pager having a control capcode can recognize an address codeword having address data 102 corresponding to the control capcode, and upon such recognition, can execute certain pager programming instructions contained in the function data 103 or in subsequent message codewords 109.

Figure 3:
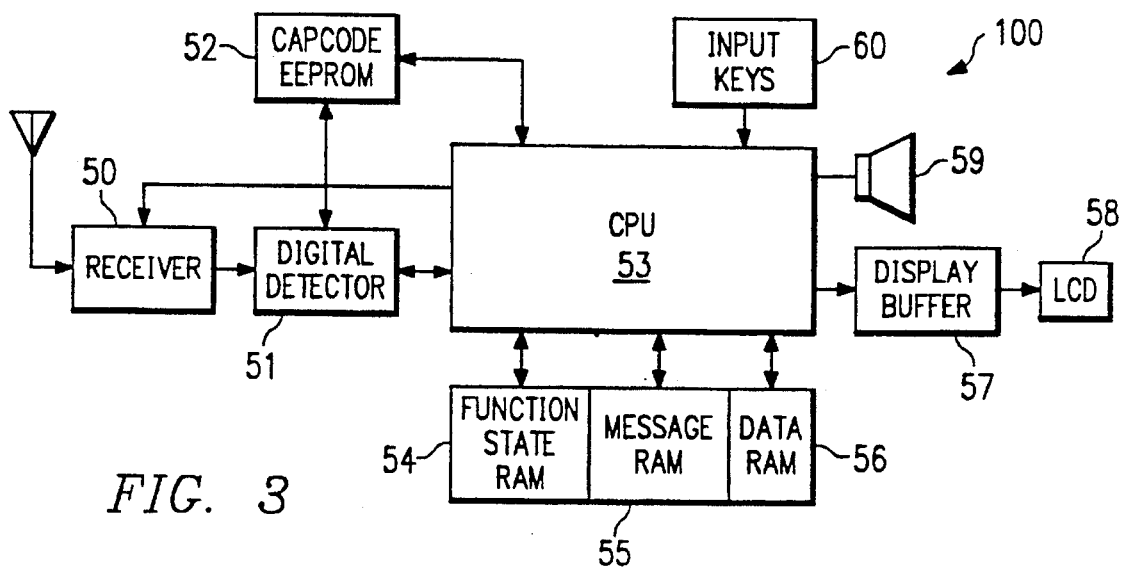
FIG. 3 is a functional block diagram schematic of a pager receiver suitable for employing the principles of the present invention.

Referring now to FIG. 3, each pager 100 includes a receiver 50 and digital detector 51 for receiving and demodulating incoming radio signals. The detector 51 is coupled to a controller, such as a central processing unit (CPU) 53, for reading the demodulated data stream. Alternatively, the controller may read the data with separate decoding and comparison means, such as a FSK decoder and shift register comparator or CPU comparator. The CPU 53 in turn controls the activation of the receiver 50. Each pager 100 includes memory storage for holding received information, including a function state memory 54, a message memory 55 and a data memory 56. In a preferred embodiment, this memory storage is a random access memory (RAM). The pager also includes a capcode memory 52 for storing the various storage, special maildrop (to be described below) and control capcodes. For purposes of the following description, a pager may have storage capcodes which are used for storage of message information, a control capcode which is used for remote programming of a pager and is described more fully below, or a special maildrop capcode which is used for selective updating of a previously stored text. In a preferred embodiment, the capcode memory 52 is an EEPROM.

In addition, input keys 60, output display buffer 57, LCD display 58, and output alert 59 and are also coupled to the CPU 53. The various pager capcodes are stored in capcode slots in the capcode memory 52. A capcode slot is essentially a fixed address in the memory 52 in which a capcode number is stored.

Figure 4:
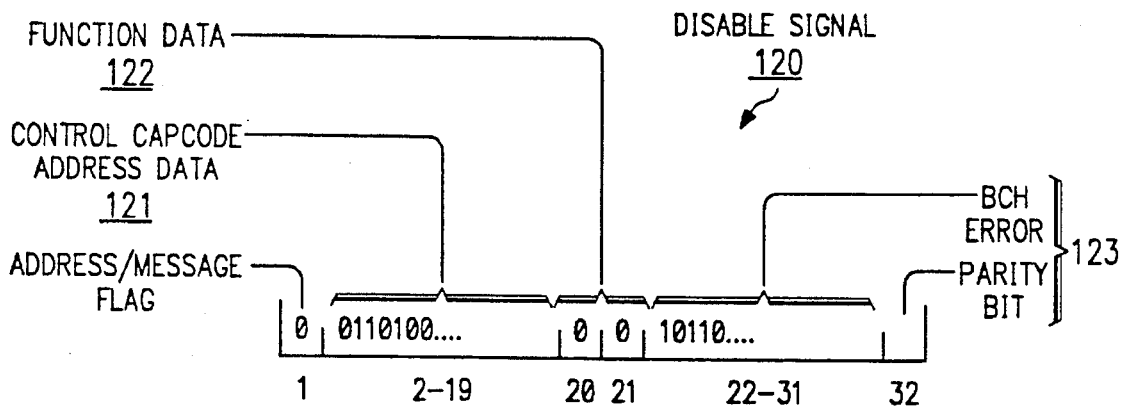
FIG. 4 is a digital representation of a pager programming instruction for disabling a pager.

In accordance with one embodiment of the present invention and with reference to FIG. 4, the control capcode is used along with pager programming instructions to disable the paging service for a particular pager so that message data received while the pager is disabled will be placed in memory but will not be displayed and so that the display 58 shows "Service Terminated." As shown in FIG. 4, pager service for a particular pager 100 can be remotely disabled by transmitting a disable signal comprised of an address codeword in the appropriate frame (i.e., frame 4) having address data 121 corresponding to the control capcode, and further transmitting function data 122 having a first state (i.e., "00" ). Upon receiving the control capcode address data corresponding to the control capcode, the central processing unit (CPU) receives and processes the function data 122 following the control capcode address data 121. In response to function data 122 having a first state (See bits 20–21), the CPU 53 disables the pager and causes the pager display 58 to show "Service Terminated." The subsequent error correction data and parity bit 123 is not important for purposes of describing the present invention insofar as persons skilled in the art will understand how the error correction data is used.

Figure 5:
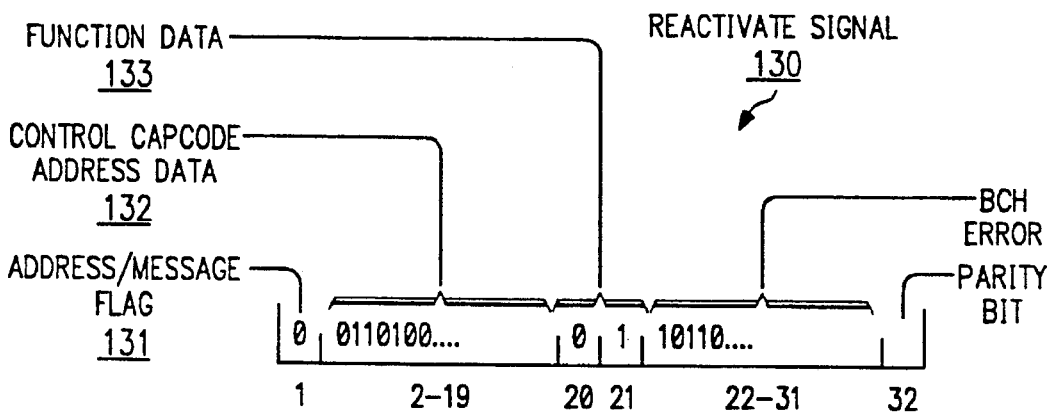
FIG. 5 is a digital representation of a pager programming instruction for re-activating a pager.

According to another embodiment of the present invention, the control cap code is used to remotely reactivate a disabled pager by transmitting a reactivate signal 130 as shown in FIG. 5 in which the first bit (the Address/Message Flag 131) is set to "0," the address data 132 (bits 2–19) corresponds to the control capcode, and the function data 133 (bits 20, 21) is in a second state (e.g., "01"). Again, the pager's CPU 53 turns "on" the receiver 50 at the appropriate frame after having detected a preamble signal and synchronization signal, recognizes that an address codeword is being transmitted upon reading the Address/Message Flag 131 which is set to "0," recognizes that the pager's control capcode matches with the address data 132, and then receives and processes the function data 133 which is in a second state. In response to the control capcode address data 132 and function data in a second state, the CPU reactivates the pager display 58 so that the display no longer reads "Service Terminated" and so that message data can be displayed.

In accordance with a further embodiment of the present invention as shown in FIG. 6a, a control capcode address codeword 141 and message codewords 142a, 142b in a reprogram signal 140 are used to provide pager programming instructions to the pager so that a storage capcode can be changed or other specifications associated with a capcode can be changed, such as the function data or maildrop activation.

In order to remotely program a change in one of the storage capcodes, a reprogram signal 140 is transmitted having address data 143 corresponding to the control capcode and having function data 144 in a third state (e.g., "10"), and further including additional message codewords 142 which contain instructions to the pager for reprogramming the storage capcodes. In particular, the message data portions 145a, 145b of the message codewords 142a, 142b following the address codeword 141 contain digital representations of the instruction characters which the CPU processes in its reprogramming of the storage capcodes. These instruction characters comprise the reprogramming instruction character sequence 150 shown in FIG. 6b.

When received and processed by the pager CPU, the reprogram instruction 150 effects a change in one of the storage capcodes. The first character in the reprogram instruction 150 is the capcode slot number 151 which indicates the capcode slot in which the capcode to be changed is stored. The next seven characters (positions 2–8) in the reprogram instruction 150 are the new capcode characters 152 which contain the new capcode number. The new capcode number must be between 0000008 and 2097151 because of requirements under the POCSAG testing scheme. It will be understood that an "old" capcode number may be transmitted if one wishes to reprogram associated specifications for the capcode, as opposed to creating a new capcode.

The five characters in character positions 9–13 of the reprogram instruction 150 are the security code characters 153 which contain the security code for the pager device to provide security against improper programming. The transmitted security code characters 153 must match the pager's security code for the process to be completed.

Because selected embodiments of the present invention include capcodes which can receive only alphanumeric data (i.e., cannot be programmed for numeric-type data), or can instead be designated to receive either numeric-type or alphanumeric data, the reprogram instruction 150 may further include in positions 14 and 15 the alpha/numeric characters 154 which contain the alpha/numeric designation for selected functions of the new capcode, whereby a "1" indicates an alphanumeric designation (i.e., numeric and letter data is to be received) and a "0" indicates a numeric-type designation (i.e., only numeric data is to be received). In a preferred embodiment, there is no alpha/numeric designation for Functions C or D because, as shown in FIG. 10, these functions are fixed as alphanumeric, and cannot be designated to receive numeric-type data. The importance of the capcode's data type designation arises from the number of bits required to communicate a particular character in the respective data type schemes.

The four characters in character positions 16–19 are the function activation characters 155 which turn "on" or "off" the specific functions (Functions A–D, respectively). A "1" indicates that the function is to be turned "on" and a "0" indicates that the function is to be turned "off." The selective activation or deactivation of specific functions for a storage capcode can be useful when, for instance, a subscriber is receiving four different information services under a given storage capcode, but fails to pay for the service provided under Function D of that capcode. At this point, the provider of the information service can remotely program this subscriber's pager to deactivate or turn "off" Function D under this capcode until payment is received.

In a preferred embodiment of the present invention, there are three storage capcodes and two maildrop capcodes which can be remotely reprogrammed and which are stored in capcode slot numbers 1–5. The capcode stored in slot number 6 is a control capcode which cannot be changed. The capcode slot number 151 of the reprogram instruction 150 must be a 1, 2, 3, 4, or 5, or the change process will be terminated. The transmitted security code 153 contained in character positions 9–13 must match the pager's security code, or else the reprogramming is terminated. Also in this preferred embodiment, the total message length of character instruction 150 must contain a certain minimum number of characters. For instance, numeric only pagers need only receive 13 characters, there being no need to select between alphanumeric and numeric only type data. Other receivers may require that a minimum of 20 characters be transmitted and received. If the minimum number of characters is not received, the process terminates. Additional characters may be optionally included, such as function activation characters 155 or the maildrop activation character 156. The POCSAG frame assignment of the new capcode must match the frame of the pager or the reprogramming process will be terminated. In addition, the function activation characters 155 (character positions 16–19) must contain "0"s or "1"s or else the reprogramming will be terminated.

Over-the-air programming of a pager's capcodes is thus accomplished upon reception of address data 143 corresponding to the control capcode and function data 144 having a third state, and upon further reception of message codewords 142a, 142b collectively containing a pager programming instruction such as the reprogram instruction 150 shown in FIG. 6b. After processing the control capcode address data 143 and function data 144 having a third state, the CPU 53 processes the following message codewords 142a, 142b into the pager programming instruction character sequence 150 and acts upon these instructions to replace the capcode in the indicated capcode slot 151 with the new capcode 152, to check the transmitted security data 153 to the pager's own security code, to store the alpha/numeric designation information 154 for Function A and Function B in the function data memory 54, and to activate or deactivate the specific Functions A–D as required by the function activation characters 155 (character positions 16–19). By way of example, the implementation of the instruction set 150 shown in FIG. 6b would place in capcode slot number 2 the new capcode number "0699047" and it would designate Function A and Function B as numeric-type, and would further turn "on" Functions A, B and C but would turn "off" Function D.

According to a still further embodiment of the present invention as shown in FIG. 7a, the control capcode is used to remotely activate or deactivate selected capcodes by transmitting an address codeword 157 containing control capcode address data 157a, function data 158 having a fourth state (e.g., "11" ) and message codewords 159 containing a digital representation of the pager programming instruction character sequence which is a capcode activation instruction 160 shown in FIG. 7b. After receiving and processing the control capcode address data 157 and function data 158 having a fourth state, the CPU recognizes that the first character 161 of the capcode activation instruction 160 is a command code character which indicates which capcode slot will be turned "on" or "off." By way of example, FIG. 7c shows a command code chart indicating the capcode slot activation status for each command code number in an embodiment of the invention having five programmable capcodes. Again, control capcodes cannot be programmed, but storage capcodes and maildrop capcodes are programmable.

Characters positions 2–8 of the capcode activation instruction 160 contain the capcode number 162 which is to be turned "on" or "off." In a preferred embodiment, this capcode number 162 must match the capcode in the indicated capcode slot 161 or the remote activation process will be terminated. The following five characters 163 in positions 9–13 are the security code which must match with the pager's own security code, or else the remote capcode activation will abort.

As described in the various embodiments of the present invention, the CPU processes the instruction character sequence serially and aborts the process if any particular subinstruction is out of format (i.e., the function activation characters are not a "1" or "0"). However, it is contemplated that the CPU may process the entire instruction character sequence in parallel instead of serially to arrive at a simultaneous determination of whether the subinstructions are out of format. In this way, the capcode activation instruction is executed only if the command code is recognized, the designated capcode number corresponds to the pager frame, and the security code is proper.

Upon implementation of the capcode activation instruction 160 shown in FIG. 7a, the capcode in capcode slot number 2 having number "0699047" would be turned "on," assuming that the transmitted capcode number 162 matched with the stored capcode number in slot number 2 and that the transmitted security code 163 matched with the pager's security code.

Figure 8:
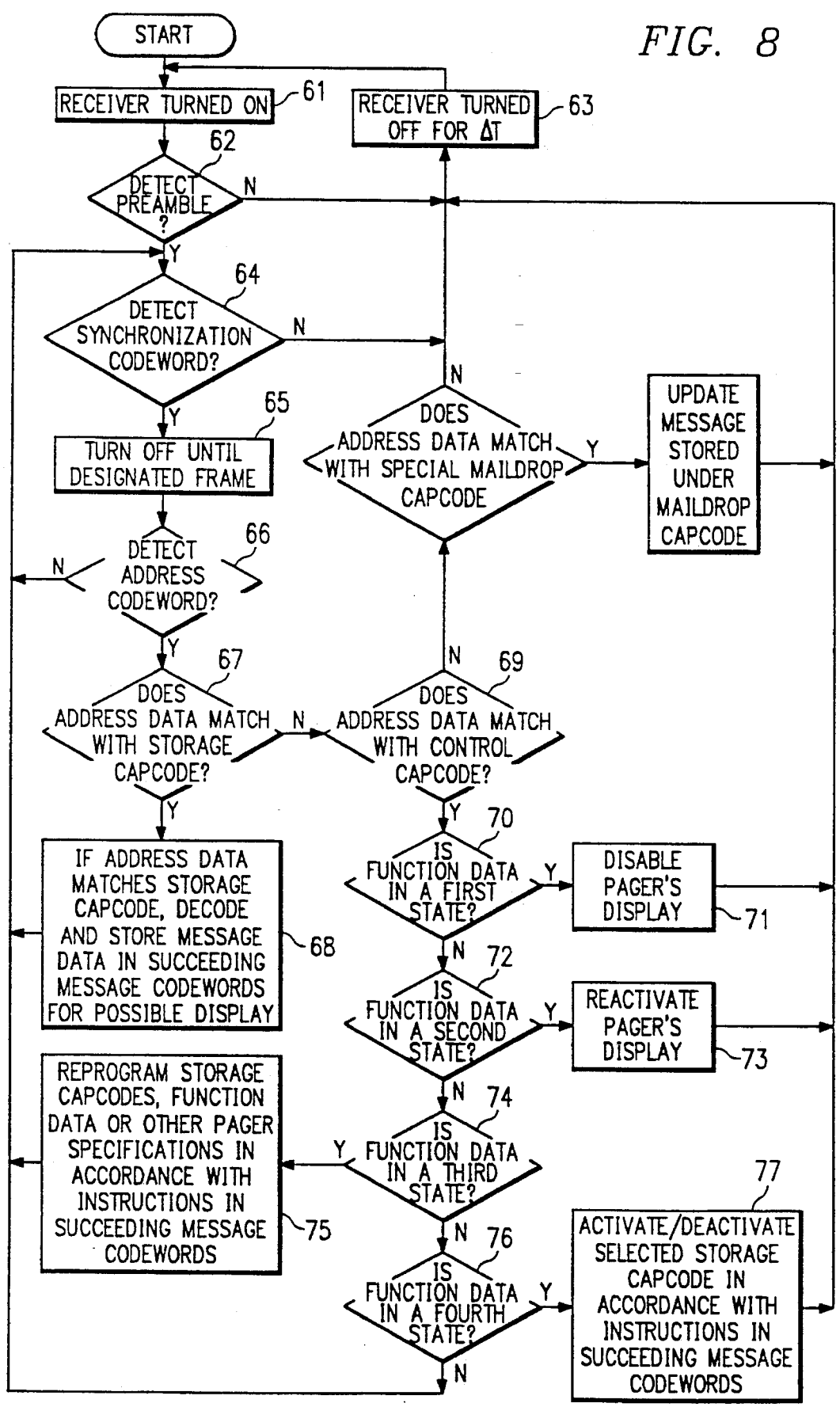
FIG. 8 depicts a flow chart illustrating paging receiver operations of one embodiment of the present invention.

The flow chart of FIG. 8 exemplifies the operation of the paging receiver in regard to a number of embodiments of the present invention illustrated and described above. Referring to FIG. 8, the receiver 50 is turned on (block 61) by the CPU 53 for an amount of time (i.e., 217 milliseconds) in order to detect any preamble data (block 62). If no preamble data is detected, the receiver is turned off for a predetermined amount of time ΔT (block 63), but if the preamble is detected (as determined by the decisional block 62), the pager then seeks to detect a synchronization codeword $S_c$ (decisional block 64). Upon detection of the synchronization codeword, the receiver 50 is deactivated until the pager's designated frame in the succeeding batch is transmitted (block 65). Alternatively, the pager may be designed to look only for the synchronization codeword, or a portion thereof which is common to both the synchronization codeword and preamble. For purposes of the present illustration, the pager 100 has been assigned frame 4 as its designated frame.

Upon being turned "on" to read the codewords in the designated frame, the pager reads the incoming data stream to detect any address codeword (decisional block 66) which contains address data that matches with any of the capcodes stored in capcode slot numbers 1–5 of the capcode memory 52 (decisional block 67). If no address codeword is detected in the frame (i.e., there is no Address/Message Flag set to "0"), the receiver is turned off or is reset to look for a synchronization codeword (block 64).

Because there are different types of capcodes stored in the pager capcode memory 52, the pager must determine whether a storage capcode, special maildrop capcode or control capcode has been transmitted. If the address data matches with a storage capcode (decisional block 67), the message data contained in the succeeding message codewords is decoded and stored in the message memory 55 for possible display on the pager LCD 58 (block 68). If, however, the transmitted address data does not match with a stored capcode, but instead matches with the control capcode (decisional block 69), the CPU 53 then processes the function data to determine which function state has been transmitted. If the function data is in a first state (decisional block 70), the pager's display 58 is disabled so that message data cannot be displayed and "Service Terminated" is shown on the display 58 (block 71).

If the function data is in a second state (decisional block 72), the CPU is instructed to reactivate the pager display 58 so that message data can be shown thereon (block 73).

If the function data is instead in a third state (decisional block 74), the CPU recognizes that selected storage capcodes, function data or other pager specifications are to be reprogrammed in accordance with the pager programming instructions contained in succeeding message codewords (block 75).

If the function data is not in the first, second or third state, but is instead in a fourth state (decisional block 76), the CPU activates or deactivates a selected capcode, the identity of which is provided in the instruction character sequence contained in succeeding message codewords (block 77).

The order of detecting the various types of capcodes may be altered so that the special maildrop capcode is detected first, or any other ordering is accomplished.

Figure 9:
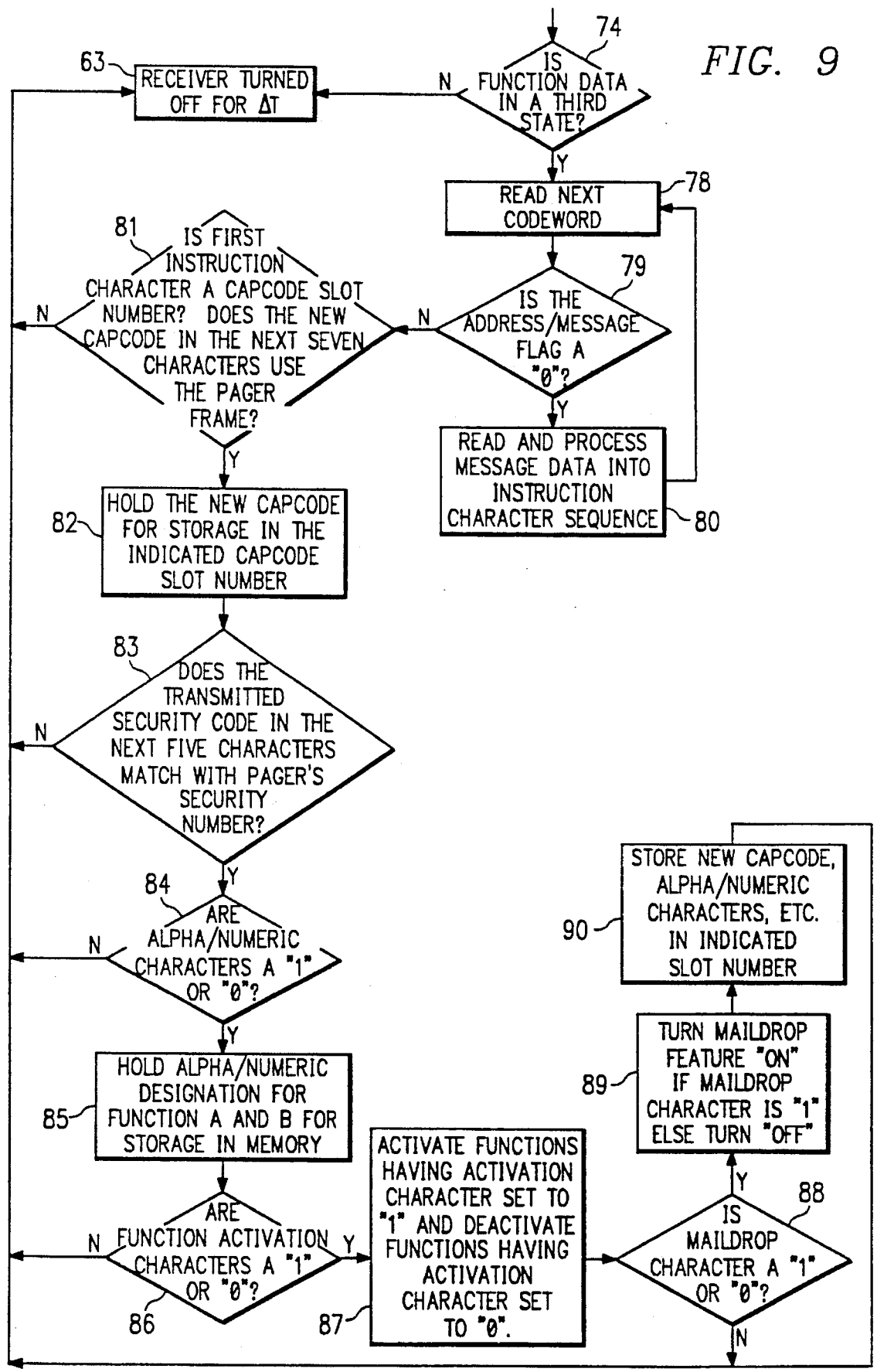
FIG. 9 depicts a flow chart illustrating paging receiver operations of an embodiment of the present invention suitable for use with the reprogram signal of FIGS. 6a and 6b.

The flow chart of FIG. 9 exemplifies the operation of the paging receiver in regard to the reprogramming of the stored capcode, function data or other pager specifications associated with a particular capcode upon reception of address data corresponding to the control capcode and function data in a third state. After detection of the control capcode address data and function data having a third state (decisional block 74), the CPU reads the succeeding codeword (block 78) to detect the presence of message codewords 142a, 142b (i.e., the presence of codewords with an Address/Message Flag 145a, 145b set to "1") (decisional block 79). The message data 145a, 145b from these message codewords 142a, 142b is received and processed into an instruction character sequence (block 80) until the CPU recognizes that no further message codewords 142 have been transmitted (i.e., the Address/Message Flag is not set to "1") (decisional block 79). This sequence is the reprogram instruction 150 shown in FIG. 6b. The CPU then determines whether the first instruction character, slot character 151, of the reprogram instruction 150 corresponds to one of the storage capcode slot numbers (decisional block 81). If not, the process is terminated. The CPU also determines whether the new capcode 152 contained in character positions 2–8 of the reprogram instruction 150 uses the same frame as the pager's designated frame (decisional block 81). If not, the process is terminated.

When the slot character 151 correctly indicates a capcode slot number and the CPU determines that the new capcode 152 uses the same frame as the pager's frame, the new capcode 152 is saved for storage in the indicated storage capcode slot number where it will replace the previously stored capcode (block 82). The CPU then compares the transmitted security code 153 to the pager's security code (decisional block 83) and stores the alpha/numeric designations 154 for Functions A and B in the function memory 54 so long as the alpha/numeric characters are set to either "1" or "0" (decisional blocks 84, 85). In a preferred embodiment, the reprogram instruction will only be executed if the required minimum number of characters is transmitted, including at least a proper slot character 151, capcode characters 152, and matching security code 153. Alternatively, a "no" decision in any of the decisional blocks 81, 82, 83 or 84 can terminate the reprogram process. As can be appreciated, the above-described decisions can be executed in parallel, or in various subcombinations can be executed simultaneously.

The individual Functions A through D are turned "on" or "off" in accordance with the function activation characters 155 whereby a "1" activates the corresponding function while a "0" deactivates the corresponding function (decisional blocks 86, 87). Finally, the maildrop instruction 156 is processed for the particular capcode and function whereby the maildrop is activated when the maildrop character 156 is set to a "1" but is deactivated if the maildrop character 156 is set to "0." The use of the maildrop instruction will be explained more fully now.

To permit more efficient retransmission of information to communication receivers, a still further embodiment of the present invention provides pager programming instructions which permit remote placement of selected data into a previously stored message text which has been stored under a special maildrop capcode. For instance, FIG. 10 illustrates a capcode arrangement for a pager receiver in which capcode slot numbers 1–3 are storage capcodes, and capcode slot numbers 4 and 5 are special maildrop capcodes. Each special maildrop capcode has associated with it four different functions (Functions A–D), each function having the capacity to store 480 characters of information.

Certain types of information provided by pager information services is highly repetitive in nature with only small portions of a particular message being changed with respect to earlier messages. For example, information services which provide stock market information or football scores consist primarily of alphanumeric characters (i.e., the names of the stocks or of the football teams) with only the numeric-type data being changed over the course of repeated transmissions (i.e., the quoted price for the stocks or the football score). When the information service is repeatedly updated (i.e., a change in the score), a portion of the message is unchanged, but may nonetheless be repeatedly transmitted, thereby requiring valuable transmission time for transmission of the unchanged information. The special maildrop feature of the present invention allows the information to be updated without retransmitting the entire message. Only the updated information is required to be sent. This reduces the air time required by conventional pagers to receive updates into stored messages.

Once an original message text has been stored in the pager memory under any of the functions in capcode slot numbers 4 or 5 (i.e., the special maildrop capcodes) such as the football score information shown in FIG. 11a, the pager programming instruction permits updating of the football score without requiring retransmission of the entire message text. For instance, an information service using the capcode in capcode slot number 4, Function C (as shown in FIG. 10), could be updated with an update instruction to show that the score has changed from "98 to 0," as seen in FIG. 11a, and is now "100 to 0." As shown in FIG. 11b, such an update would require the transmission of an address codeword in the appropriate frame for the pager with address data 162 corresponding to the special maildrop capcode stored in capcode slot number 4 along with function data 163 corresponding to Function C. Upon reception of special maildrop capcode address data 162, the CPU recognizes that the following message data 164 contains special maildrop instruction characters 160, as shown in FIG. 11c, which are to be processed by the CPU.

The first character of a special maildrop pager programming instruction is the "/" which is the special maildrop activation command character 166. The next five characters tell the CPU where the new information is to be added and the message length of the new information. In particular, the second character of the maildrop instruction 160 contains the starting character position 167 for the update message data. Because there are only 16 character positions for each screen to be displayed, the starting character position 167 must be a 0–9 or A–F (the hexadecimal representation of 16 positions).

The next two characters of the maildrop instruction 160 contains the line number instruction 168 which indicates the line number of the information to be updated. In one embodiment, individual lines may be indicated with the hexadecimal numbers 00–FF. The fifth and sixth characters of the maildrop instruction 160 contain the message length instruction 169 which is the length of the update message. Again, the message may be up to 255 characters under the hexadecimal instruction format. Thus, the first position is the special maildrop activation command character 166, the second through fourth positions indicate the line number 168 and starting character position 167 for the update information, and positions five and six indicate the length 169 of the message to be updated. These first six character positions (the command section of the pager programming instruction) are followed by the data section 170 which sets forth the actual update information to be written into the memory position previously indicated.

In accordance with one embodiment of the present invention, the football score shown in FIG. 11a could be updated with the pager programming instruction to show that Notre Dame scored two additional points. Such an update is accomplished by transmitting an address codeword containing the special maildrop capcode 162 and function data, along with the message data 164, 165 containing the maildrop instruction 160. With the Address/Message Flag 161 set to "0," the pager reads the address data 162 and function data 163 which corresponds to special maildrop capcode (in this example, the capcode number of the capcode in slot 4, Function C) and recognizes that the succeeding message codewords contain message data portions 164, 165 which, in turn, contain instruction characters. Processing of the message data 164, 165 results in the instruction character sequence 160 shown in FIG. 11c. The first character of the maildrop instruction must be a "/" or the process is terminated. The "/" character is the special maildrop activation character 166. The second character of the maildrop instruction 160 is the starting character position 167 for the update message. Sixteen possible character positions in the pager screen are indicated with the hexadecimal representation 0-9, A-F. In addition, a "J" occurring at this position is an instruction to delete all characters from this row to the end, and a "K" character is an instruction to delete this row only.

The third and fourth characters in the maildrop instruction 160 (positions 3, 4) indicate the line number 168 on which the update information is to begin. Because two characters are used with this particular sub-instruction, up to 256 line numbers can be indicated with the hexadecimal representation of 00–FF. In a preferred embodiment of the present invention, the pager receiver uses only 30 lines or screens and 16 character positions for a maximum special maildrop message link of 480 characters.

The length of the update message to be added is indicated in positions 5 and 6 of the maildrop instruction 160. The message length instruction 169 shows the message length. Again, this message length can in theory be up to 255 characters, but in a preferred embodiment, the maximum message length is 234 characters.

Finally, the actual text of the update message to be added begins at position 7 of the maildrop instruction 160.

By way of example, transmission of a data stream as shown in FIG. 11*b* having message data 164, 165 which contains the maildrop instruction 160 shown in FIG. 11*c* results in a change to the display output of the pager indicated in FIG. 11*a*. Upon reception of the address codeword shown in FIG. 11*b*, the CPU recognizes that the address data 162 corresponds to the pager's special maildrop capcode in capcode slot number 4, Function C (function data= "10"). The CPU then processes the message data 164, 165 into the maildrop instruction 160 shown in FIG. 11*c*. The special maildrop activation character 166 of this instruction character sequence 160 activates the special maildrop with the "/" character. The character position 167 and line number 168 of the maildrop instruction 160 then instructs the CPU that the update message is to be placed at character position 11 (i.e., position B in hexadecimal) on line 0 (i.e., line 00 in hexadecimal). The message length characters 169 indicate that the new message is to be three characters in length, and the update data 170 provides the text of the update information to be placed as indicated in the command section. Thus, the update information "100" will replace the old information "98" to reveal that Notre Dame has scored two more points over Miami to result in a new score of "100 to 0."

Thus, in accordance with an embodiment of the present invention, a method is provided for over-the-air programming of a pager receiver which receives radio communications transmitted in the POCSAG format. The method provides for the reception and demodulation of a data stream contained in a radio signal. The data stream is arranged in a sequence of frames with each frame comprising two codewords. A codeword may be an address codeword comprised of address data and function data, or may instead be a message codeword comprised of message data.

The pager reads the data from the frame assigned to the pager and compares any address data to the capcodes stored in the pager (i.e., the storage capcodes, the maildrop codes or the control capcode). If identity is detected between the address data of the designated frame and one of the storage capcodes, the pager processes and stores message data from succeeding message codewords under the storage capcode and indicated function state. If the identity is detected between the address data and one of the special maildrop capcodes, a previously stored message text is selectively updated in accordance with the positioning and message length instructions contained in the succeeding message codewords. However, if the address data matches with the control capcode, the pager executes pager programming instructions contained in the data stream following the address data. Thus, the pager can execute any number of programming instructions upon receipt of address data corresponding to the control capcode. By way of example and not limitation, such instructions would include disabling the pager from displaying any message data, reactivating a previously disabled pager so that message data can be displayed, activating or deactivating selected storage capcodes, or reprogramming (i.e., changing) a storage capcode number or its associated function states.

Although several embodiments of the invention have been illustrated in the accompanying drawings and described in the foregoing Detailed Description, it will be understood that the invention is not limited to the embodiments disclosed but is capable of numerous rearrangements, modifications and substitutions without departing from the scope of the invention.

We claim:

1. A POCSAG coding protocol pager comprising:

a selectively activated receiver for receiving a radio signal organized into frames of information and demodulating the radio signal into a data stream comprised of address data, function data and message data, a capcode memory for storing a plurality of capcodes, a message memory for storing message data, and a controller for activating the receiver during a frame assigned to the pager under the POCSAG protocol and comparing the address data in the assigned frame to the capcodes and, upon detection of a match between the address data and a capcode, for reading the function data and message data from the assigned frame, said controller being programmed to disable the pager upon reception of address data corresponding to a control capcode and function data having a first state, said address data and function data being contained in the assigned frame.

2. The POCSAG coding protocol pager as described in claim 1 wherein message data received while the pager is disabled is placed in the message memory but is not displayed.

3. The POCSAG coding protocol pager as described in claim 2 wherein the controller is further programmed to reactivate the pager upon reception of address data corresponding to a control capcode and function data having a second state so that message data is displayed, said address data and function data being contained in the assigned frame.

4. A method for over-the-air programming of a pager which selectively receives a radio signal transmitted in the POCSAG format wherein a data stream is arranged in a sequence of frames, each frame comprising an address codeword comprised of address data and function data or a message codeword comprised of message data, said pager having at least a storage capcode and a control capcode, said method comprising the steps of:

receiving the radio signal during a designated frame, comparing the address data from the designated frame to the storage and control capcodes for identity, processing for storage and display any message data following the address data if the address data from the designated frame coincides with a storage capcode, and disabling the pager upon reception of address data corresponding to a control capcode and function data having a first state, said address data and function data being contained in the designated frame.

5. The method for over-the-air programming described in claim 4 wherein the disabling step comprises disabling the pager from displaying any message data and storing in memory any message data received while the pager is disabled.

6. The method for over-the-air programming described in claim 5, additionally comprising the step of reactivating the pager so that message data can be displayed upon reception of address data corresponding to a control capcode and function data having a second state, said address data and function data being contained in the designated frame.

\* \* \* \* \*